(12) United States Patent
Sadovsky et al.

(10) Patent No.: US 8,332,206 B1
(45) Date of Patent: Dec. 11, 2012

(54) DICTIONARY AND TRANSLATION LOOKUP

(75) Inventors: Adam Sadovsky, Mountain View, CA (US); Awaneesh Verma, Mountain View, CA (US); Chen Ding, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,714

(22) Filed: Sep. 26, 2011

Related U.S. Application Data (63) Continuation of application No. 13/223,201, filed on Aug. 31, 2011.

(51) Int. Cl.
*G06F 17/28* (2006.01)
*G06F 17/20* (2006.01)
*G06F 17/27* (2006.01)
*G06F 17/21* (2006.01)
*G06F 15/16* (2006.01)
*G06F 3/00* (2006.01)
*G06F 3/048* (2006.01)
*G06F 17/30* (2006.01)

(52) U.S. Cl. ............. 704/5; 704/3; 704/7; 704/8; 704/9; 704/10; 715/740; 715/781; 715/782; 715/802; 709/227; 709/203; 707/899

(58) Field of Classification Search .................... 715/782
See application file for complete search history.

(56) References Cited

U.S. PATENT DOCUMENTS

| | | | | |
|---|---|---|---|---|
| 6,041,344 | A * | 3/2000 | Bodamer et al. ............. | 709/203 |
| 7,155,517 | B1 * | 12/2006 | Koponen et al. ............. | 709/227 |
| 8,135,575 | B1 * | 3/2012 | Dean ................. | 704/7 |
| 2002/0111792 | A1 * | 8/2002 | Cherny ........................ | 704/8 |
| 2003/0023424 | A1 * | 1/2003 | Weiner ........................ | 704/8 |
| 2004/0138872 | A1 | 7/2004 | Nir | |
| 2006/0271352 | A1 * | 11/2006 | Nikitin et al. ................. | 704/9 |
| 2007/0005338 | A1 | 1/2007 | Vrijsen | |
| 2007/0033002 | A1 * | 2/2007 | Dymetman et al. ............. | 704/5 |
| 2007/0219782 | A1 * | 9/2007 | Li .................................. | 704/10 |
| 2009/0132234 | A1 * | 5/2009 | Weikel ........................... | 704/3 |
| 2009/0182548 | A1 | 7/2009 | Zwolinski | |
| 2009/0204386 | A1 * | 8/2009 | Seligman et al. ............. | 704/2 |
| 2010/0128994 | A1 | 5/2010 | Zwolinski | |
| 2010/0185434 | A1 * | 7/2010 | Burvall et al. ................. | 704/3 |
| 2011/0066970 | A1 * | 3/2011 | Burrier et al. ................ | 715/782 |
| 2011/0219313 | A1 * | 9/2011 | Mazzaferri ................. | 715/740 |

\* cited by examiner

*Primary Examiner* — Pierre-Louis Desir
*Assistant Examiner* — Neeraj Sharma
(74) *Attorney, Agent, or Firm* — McDermott Will & Emery LLP (57) ABSTRACT

A computer-implemented method for providing a definition or a translation is disclosed according to an aspect of the subject technology. The method comprises receiving an input indicating a word selected by a user, sending a definition request for the word to a definition server, receiving a response to the definition request from the definition server, sending a translation request for the word to a translation server, and receiving a response to the translation request from the translation server. The method also comprises determining whether to provide the user with a definition or a translation of the word based on the responses from the definition server and the translation server, and providing the user with the definition or the translation of the word based on the determination.

22 Claims, 6 Drawing Sheets

DICTIONARY AND TRANSLATION LOOKUP

CROSS-REFERENCE TO RELATED APPLICATIONS

This application is a continuation of U.S. patent application Ser. No. 13/223,201 entitled "Dictionary and Translation Lookup," filed on Aug. 31, 2011, the disclosure of which is hereby incorporated by reference in its entirety for all purposes.

FIELD

The subject disclosure generally relates to computers, and, in particular, to providing a definition or a translation on a computer.

BACKGROUND

When a user reads a page (e.g., web page) on a computer, the user may come across a word that he/she does not know. For the case in which the word is in the user's language, the user may lookup a definition of the word. For the case in which the word is in a language other than the user's language (i.e., a foreign language), the user may lookup a translation of the word in the user's language. However, it may be time consuming and distracting for the user to lookup a definition or a translation each time the user comes across a word that he/she does not know.

SUMMARY

A computer-implemented method for providing a definition or a translation is disclosed according to an aspect of the subject technology. The method comprises receiving an input indicating a word selected by a user, sending a definition request for the word to a definition server, receiving a response to the definition request from the definition server, sending a translation request for the word to a translation server, and receiving a response to the translation request from the translation server. The method also comprises determining whether to provide the user with a definition or a translation of the word based on the responses from the definition server and the translation server, and providing the user with the definition or the translation of the word based on the determination.

A system for providing a definition or a translation is disclosed according to an aspect of the subject technology. The system comprises one or more processors, and a machine-readable medium comprising instructions stored therein, which when executed by the one or more processors, cause the one or more processors to perform operations. The operations comprise receiving an input indicating a word selected by a user, determining a user's language based on a user setting, sending a definition request for the word to a definition server, wherein the definition request includes an indication of the user's language, and receiving a response to the definition request from the definition server. The operations also comprise sending a translation request for the word to a translation server, wherein the translation request includes an indication of the user's language, and receiving a response to the translation request from the translation server. The operations further comprise determining whether to provide the user with a definition or a translation of the word based on the responses from the definition server and the translation server, and providing the user with the definition or the translation of the word based on the determination.

A machine-readable medium is disclosed according to an aspect of the subject technology. The machine-readable medium comprises instructions stored therein, which when executed by a machine, cause the machine to perform operations. The operations comprise receiving an input indicating a word selected by a user, sending a definition request for the word to a definition server, receiving a response to the definition request from the definition server, sending a translation request for the word to a translation server, and receiving a response to the translation request from the translation server. The operations also comprise determining whether to provide the user with a definition or a translation of the word based on the responses from the definition server and the translation server, and displaying the definition or the translation of the word within a bubble on a display based on the determination.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

When a user reads a page (e.g., web page) on a computer, the user may come across a word that he/she does not know. For the case in which the word is in the user's language, the user may lookup a definition of the word. For the case in which the word is in a language other than the user's language (i.e., a foreign language), the user may lookup a translation of the word in the user's language. However, it may be time consuming and distracting for the user to lookup a definition or a translation each time the user comes across a word that he/she does not know.

In accordance with various aspects of the subject technology, a system is provided that automatically determines whether to provide the user with a definition or a translation of a word in a page (e.g., web page) or document when the user selects the word (e.g., by double-clicking on the word), and provides the definition or the translation to the user in a pop-up bubble or window based on the determination. The system may determine to provide the user with a definition of the word when a definition of the word is available in the user's language (e.g., when the word is in the user's language). The user may specify the user's language as a setting in a web browser used to view the page. The system may determine to provide the user with a translation of the word in the user's language when a definition of the word is not available in the user's language (e.g., when the word is not in the user's language).

Figure 1:
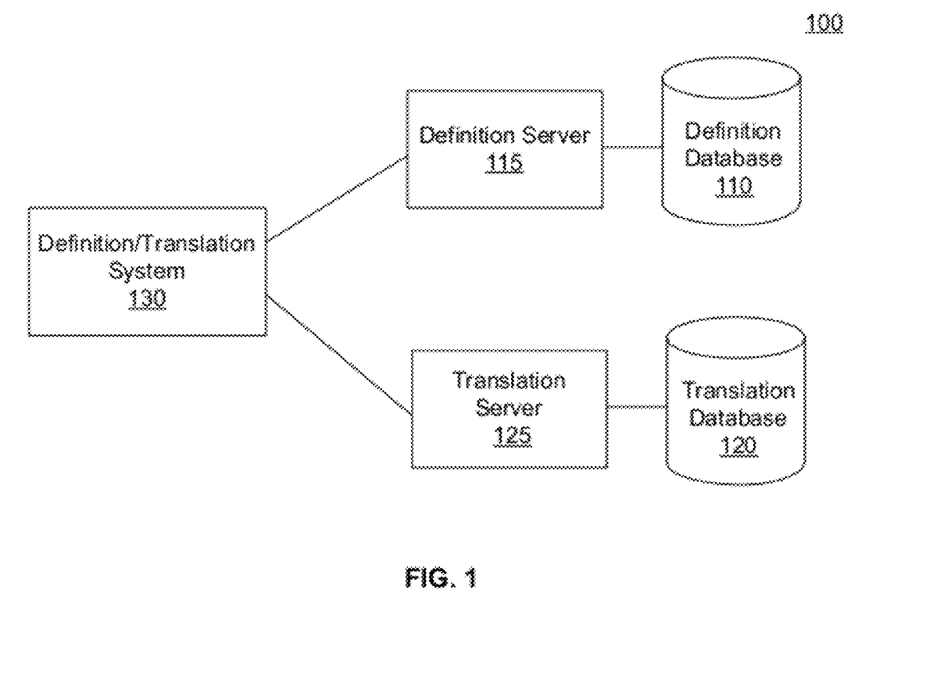
FIG. 1 shows a definition/translation system, a definition server and a translation server according to an aspect of the subject technology.

FIG. 1 shows a system 100 in accordance with various aspects of the subject technology. The system 100 may include a definition database 110, a definition server 115, a translation database 120, a translation server 125, and a definition/translation system 130.

In one aspect, when the user selects a word in a page or document (e.g., by double-clicking on the word), the definition/translation system 130 sends a definition request to the definition server 115 for a definition of the word in the user's language and sends a translation request to the translation server 125 for a translation of the word in the user's language.

In response to the definition request, the definition server 115 may search the definition database 110 for a definition of the word in the user's language. If the definition server 115 finds a definition of the word in the user's language, then the definition server 115 may generate a response message including the definition. Otherwise, the definition server 115 may generate a response message indicating that there is no definition of the word in the user's language. The definition server 115 may then send the response message to the definition/translation system 130.

In response to the translation request, the translation server 125 may detect a source language of the word and search the translation database 120 for a translation of the word in the user's language. If the translation server 120 finds a translation of the word in the user's language, then the translation server 125 may generate a response message including the detected source language of the word and the translation of the word in the user's language. Otherwise, the translation server 125 may generate a response message indicating that there is no translation for the word. The translation server 125 may then send the response message to the definition/translation system 130.

After receiving the response message from the definition server 115 and the response message from the translation server 125, the definition/translation system 130 may decide whether to provide the user with a definition or a translation of the word based on the response messages. For example, if the response message from the definition server 115 includes a definition of the word in the user's language, then the definition/translation system 130 may provide the definition to the user. If the response message from the definition server 115 does not include a definition and the response message from the translation server 125 includes a translation of the word in the user's language, then the definition/translation system 130 may provide the translation to the user. The definition/translation system 130 may display the definition or the translation of the word to the user in a pop-up bubble or window that appears next to the word. If the response message from the definition server 115 does not include a definition and the response message from the translation server 125 does not include a translation, then the definition/translation system 130 may indicate in the bubble that no definition or translation of the word is available.

Figure 2:
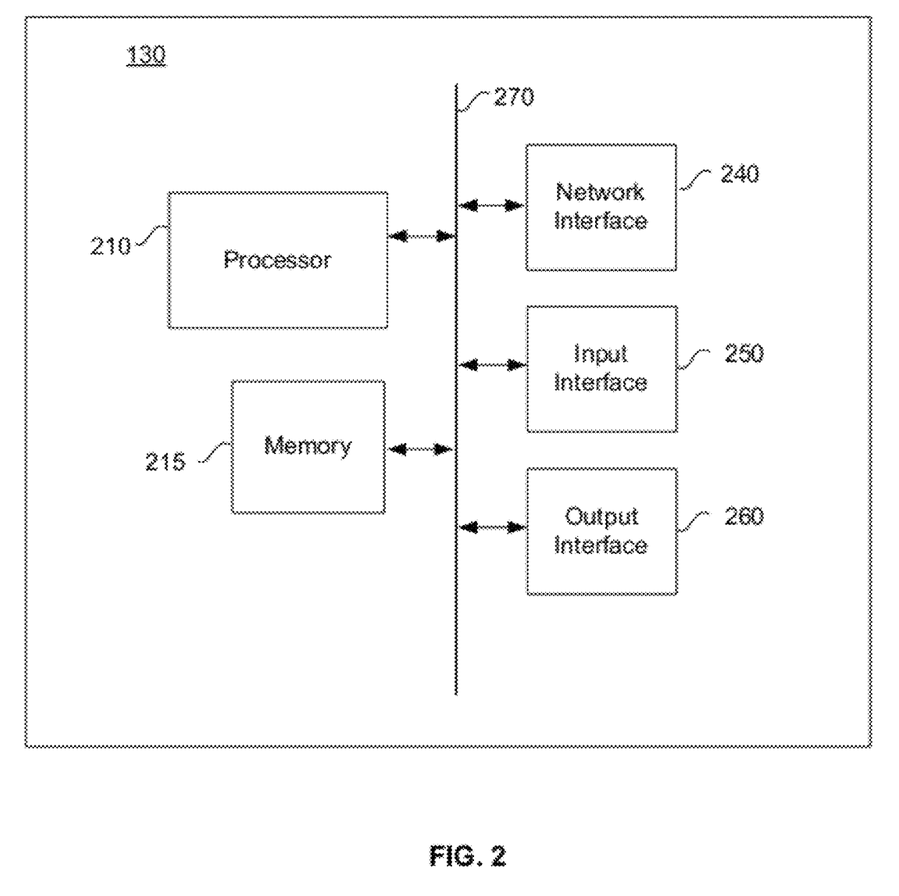
FIG. 2 is a conceptual block diagram of the definition/translation system according to an aspect of the subject technology.

FIG. 2 shows a block diagram of the definition/translation system 130 according to an aspect of the subject technology. The definition/translation system 130 may reside in a computer (e.g., a laptop computer, a desktop computer, a tablet, a smart phone, or other type of computer). While the definition/translation system 130 is shown in one configuration in FIG. 2, it is to be understood that the definition/translation system may include additional, alternative and/or fewer devices.

In the example shown in FIG. 2, the definition/translation system 130 includes a processor 210, a memory 215, a network interface 240, an input interface 250, an output interface 260, and a bus 270. The bus 270 collectively represents all system, peripheral, and chipset buses that communicatively connect the numerous devices of the definition/translation system 130. For instance, the bus 270 communicatively connects the processor 210 with the memory 215. The processor 210 may retrieve instructions from the memory 215 and execute the instructions to implement processes according to various aspects of the subject technology. The processor 210 may comprise a single processor or a multi-core processor in different implementations.

The memory 215 may include non-volatile memory, such as a solid state drive, a magnetic disk, or an optical drive. The non-volatile memory may be used to store an operating system (OS), programs, and/or files. The memory 215 may also include volatile memory, such as random access memory, to store instructions and data that the processor 210 needs at runtime. Instructions for performing processes according to various aspects of the subject technology may be stored in the non-volatile memory and loaded into the volatile memory during runtime for execution by the processor 210.

The input interface 250 enables a user to communicate information and commands to the processor 210. For example, the input interface 250 may be coupled to an alphanumeric keyboard and/or a pointing device (e.g., touch pad or mouse) to receive commands from the user. For example, the user may select a word displayed on a display by moving a cursor to the word and doubling clicking on the word using a pointing device.

The output interface 260 enables the processor 210 to communicate information to the user. For example, the output interface 260 may be coupled to a display (e.g., liquid crystal display (LCD)) and/or a printer to output information from the processor 210 to the user.

The network interface 240 enables the processor 210 to communicate with the definition server 115 and the translation server 125 over a network (e.g., a local area network ("LAN"), a wide area network ("WAN"), an intranet, the Internet). The network interface 140 may include a wireless communication module for communicating with the network over a wireless link ("WiFi wireless link, cellular wireless link, etc.).

In one aspect, the processor 210 may execute a web browser application that allows the user to download and view web pages from the Internet. In this aspect, the processor 210 may display a web page to the user on a display via the output interface 260. The user may specify the user's language (e.g., English) as a setting, which may be stored in the memory 215.

In one aspect, when the user comes across a word in a page that he/she does not understand, the user may select the word. For example, the user may select the word by moving a cursor to the word on the display and doubling clicking on the word using a pointing device.

After the user selects the word, the processor 210 may generate a definition request for a definition of the word in the user's language. The definition request may include the word selected by the user and an indication of the user's language (e.g., English). The processor 210 may then send the definition request to the definition server 115 via the network interface 240.

The processor 210 may also generate a translation request for a translation of the word in the user's language. The definition request may include the word selected by the user and an indication of the user's language (e.g., English). The processor 210 may then send the translation request to the translation server 125 via the network interface 240.

In response to the definition request, the definition server 115 may search the definition database 110 for a definition of the word in the user's language. For example, the definition database 110 may include electronic dictionaries for different languages, and the definition server 115 may search the electronic dictionary matching the user's language for a definition of the word in the user's language.

If the word is in the user's language, then the definition server 115 may find one or more definitions of the word in the definition database 110. In this case, the definition server 115 may generate a response message including the one or more definitions of the word. For the example where the definition database 110 includes multiple definitions of the word, the definition database 110 may list the multiple definitions in a certain order starting with the most common definition of the word. The response message may include the multiple definitions and list the multiple definitions according to their order in the definition database 110. For example, the top definition in the list may correspond to the most common definition of the word.

The definition database 110 may include additional information for a word such as a pronunciation of the word, a phonetic spelling of the word and/or other information. For the pronunciation of the word, the definition database 110 may include an audio file of a pronunciation of the word. In this aspect, the definition server 115 may include the pronunciation and/or phonetic spelling of the word in the response message.

If the definition server 115 does not find a definition of the word in the user's language, then the definition server 115 may generate a response message indicating that there is no definition of the word in the user's language.

After generating the response message, the definition server 115 may send the response message to the definition/translation system 130.

In response to the translation request, the translation server 125 may first detect one or more source languages of the word in the translation request. The translation server 125 may do this by parsing the word into segments, where each segment comprises a sequence of n characters in the word. The segments may overlap with one another. For example, for the English word "hello," the translation server 125 may parse the word into the segments "hell' and "ello," where each segment comprises a sequence of four characters. In this example, each segment may be referred to as a quad.

The translation server 125 may then input the segments into a language classifier that classifies the word into one or more languages from a plurality of languages based on the segments. For example, the classifier may classify the word as German when the segments occur more frequently in German than in other languages. If the classifier classifies a word into two or more languages, then, for each language, the classifier may output a probability that the corresponding classification is correct. The classifier may classify the word into two or more languages, for example, when the word is found in more than one language.

The translation server 125 may also detect one or more source languages of the word by determining which languages have a writing system (e.g., alphabet) that includes all of the characters in the word. The translation server 125 may employ other techniques to determine the source language of the word in addition to or in the alternative to the techniques discussed above.

After detecting one or more source languages of the word, the translation server 125 may search the translation database 120 for a translation of the word in the user's language for each of the detected source languages. If the translation server 125 finds one or more translations of the word, then the translation server 125 may generate a response message that includes each translation of the word including the corresponding detected source language. For each detected source language, the response message may also include the probability that the detected source language is correct.

In one aspect, the translation server 125 may only include translations for detected source languages having a probability above a certain threshold or only include the translation for the detected source language having the highest probability. In another aspect, if the translation server 125 detects the user's language as a source language of the word, then the translation server 125 may indicate this in the response message. In this case, the translation server 125 may not include a translation for the detected source language in the response message. If the translation server 125 detects other source languages in addition to the user's language, then the response message may also include the probability that the detected source language matching the user's language is correct.

In one aspect, the translation database 120 may also include a pronunciation of the word in an audio file. In this aspect, the translation server 125 may also include the pronunciation of the word in the response message.

If the translation server 125 does not find a translation of the word in the translation server 120, then the translation server 125 may generate a response message indicating that there is no translation of the word.

After generating the response message, the translation server 125 may send the response message to the definition/translation system 130.

After receiving the response message from the definition server 115 and the response message from the translation server 125, the processor 210 may process the response messages to determine whether to provide the user with a definition or a translation of the selected word.

If the response message from the definition server 115 includes a definition of the word, then the processor 210 may display the definition to the user. For example, the processor 210 may display the definition in a pop-up bubble or window next to the word on the display. If the response message includes multiple definitions of the word, then the processor 210 may display only the top definition of the word (e.g., most common definition of the word) to the user. In this example, the processor 210 may give the user the option of viewing the other definitions of the word (e.g., by clicking on a link in the bubble to the other definitions). In another example, the processor 210 may display all of the definitions of the word to the user.

If the response message from the definition server 115 also includes a phonetic spelling of the word, then the processor 210 may also display the phonetic spelling of the word to the user in the bubble. Also, if the response message includes a pronunciation of the word (e.g., in an audio file), then the processor 210 may give the user the option of hearing the pronunciation of the word by clicking on an icon in the bubble. If the user clicks on the icon, then the processor 210 may play the audio file with the pronunciation and send the corresponding audio output to a speaker, earphone or other audio output device.

Figure 3:
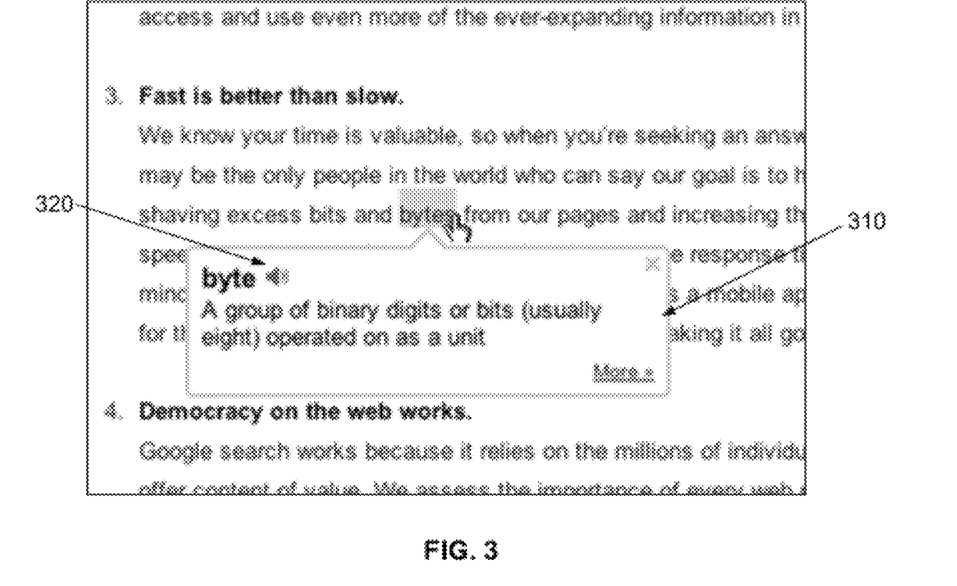
FIG. 3 shows an example of a definition of a word in a user's language according to an aspect of the subject technology.

FIG. 3 shows an exemplary screen shot in which the user selects the English word "bytes" in a web page or document (e.g., by double-clicking on the word "byte") and the user's language is set to English. In this example, the response message from the definition server 115 includes a definition of the word "byte" in English, and the processor 210 displays the definition in a pop-up bubble 310 located next to the word "bytes" in the web page or document. The bubble 310 includes a speaker icon 320 that the user can click on to hear a pronunciation of the word "byte."

If the response message from the definition server 115 indicates that there is no definition in the user's language, then the processor 210 may determine whether the response message from the translation server 125 includes a translation of the word in the user's language. If the response message from the translation server 125 includes a translation of the word in the user's language, then the processor 210 may display the translation in a pop-up bubble or window next to the word in the web page or document. The processor 210 may also indicate the source language from which the word is translated into the user's language based on the corresponding detected source language in the response message.

If the response message from the translation server 125 includes multiple translations of the word in the user's language that are translated from multiple source languages, then the processor 210 may display the translation corresponding to the detected source language with the highest probability. In another example, the processor 210 may display all of the translations to the user.

If the response message includes a pronunciation of the word, then the processor 210 may give the user the option of hearing the pronunciation of the word by clicking on an icon in the bubble.

In one aspect, before displaying a translation of the word to the user, the processor 210 may also require that none of the detected source languages matches the user's language. In another aspect, before displaying a translation of the word to the user, the processor 210 may require that at least one detected source language has a higher probability than a detected source language matching the user's language.

Figure 4:
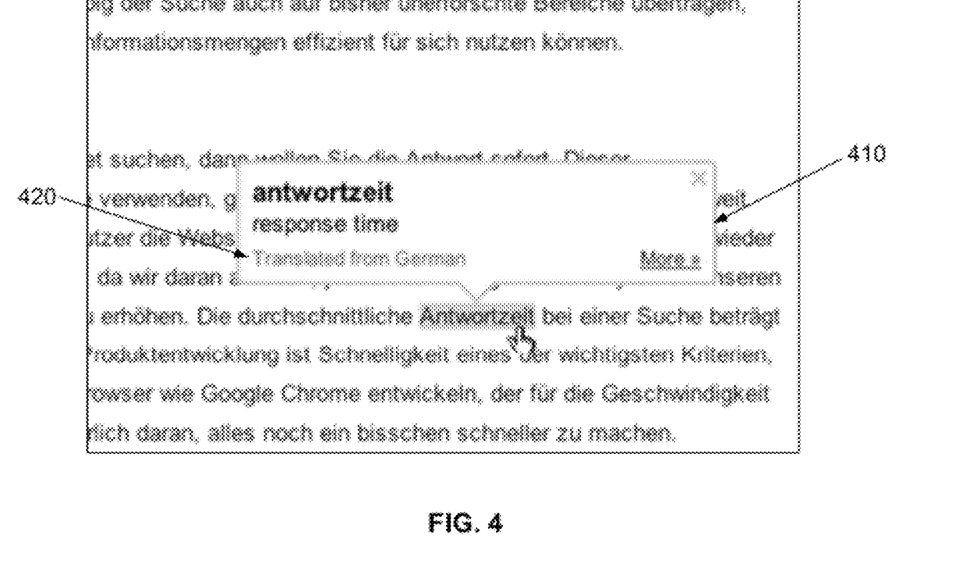
FIG. 4 shows an example of a translation of a word in the user's language according to an aspect of the subject technology.

FIG. 4 shows an exemplary screen shot in which the user selects the German word "antwortzeit" in a web page or document (e.g., by double-clicking on the word "antwortzeit") and the user's language is set to English. In this example, the response message from the translation server 125 includes a translation of the word "antwortzeit" in the user's language (English), and the processor 210 displays the translation in a pop-up bubble 410 located next to the word "anwortzeit" in the web page or document. The bubble 410 includes an indicator 420 indicating the source language (German) from which the word is translated into the user's language. In the example shown in FIG. 4, the rest of the web page or document is also in German. However, it should be appreciated that most of or all of the remaining portion of the web page or document may be in the user's language (English) or another language.

In one aspect, when the processor 210 sends a translation request to the translation server 125 for the selected word, the processor may include additional words from the corresponding page in the translation request. For example, the processor 210 may include one or more words surrounding the selected word in the page in the translation request.

In this aspect, the translation server 125 may use both the selected word and the additional words in the translation request to detect the source language of the selected word with higher accuracy. For example, the translation server 125 may parse the selected word and the additional words into a plurality of segments (quads), which may be overlapping, and input the segments into a language classifier to detect the source language of the selected word. In this example, the additional words provide additional information that may improve the accuracy of the source language detection, especially when the selected word is valid in more than one language. For example, if the selected word is valid in both Italian and Spanish and the words surrounding the selected word are in Spanish, then the translation server 125 may determine with a higher degree of accuracy that the selected word is in Spanish, and assign a higher probability to the Spanish translation.

Figure 5:
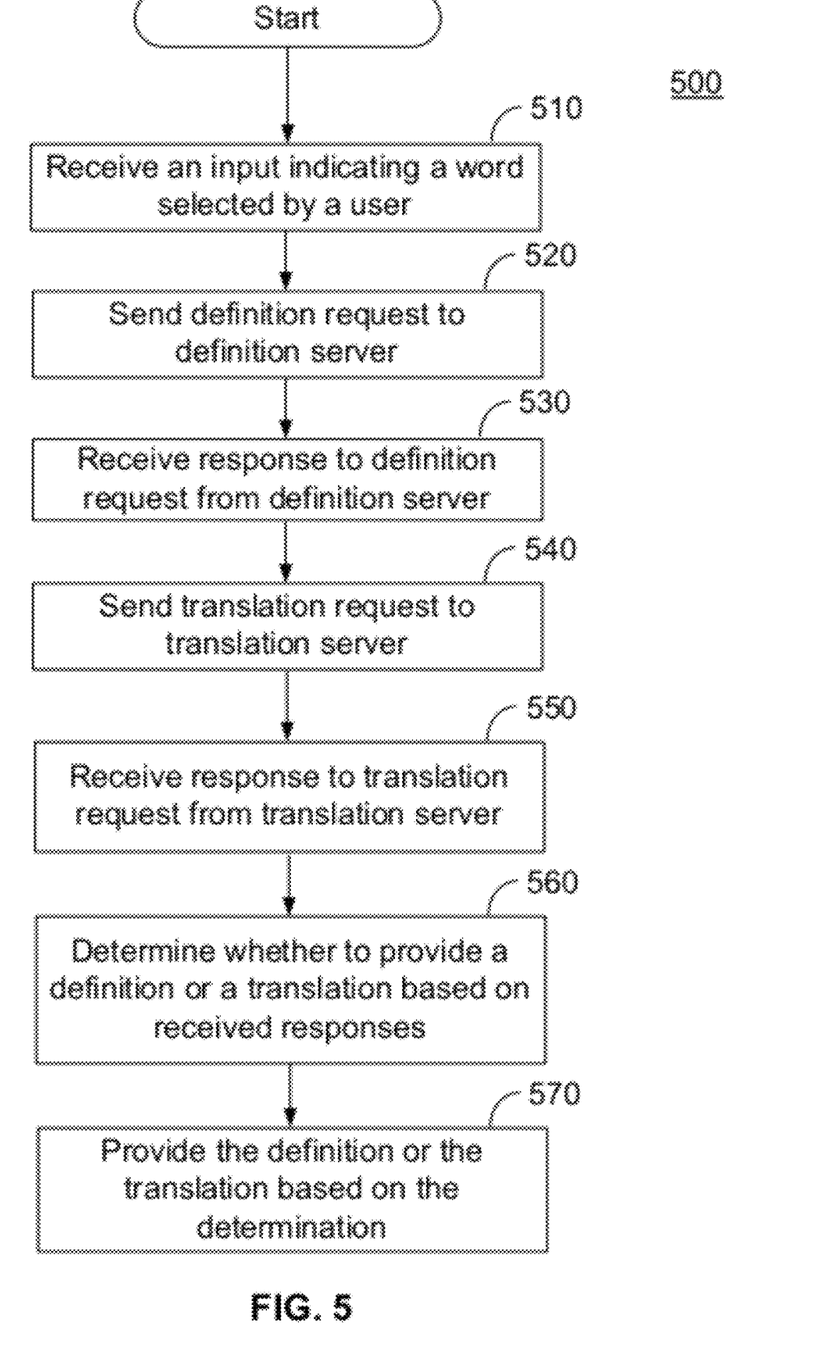
FIG. 5 is a flowchart of a process for providing a definition or a translation of a word according to an aspect of the subject technology.

FIG. 5 shows a process 500 for determining whether to provide a user with a definition or a translation according to an aspect of the subject technology. The process may be performed by the definition/translation system 130.

In step 510, an input indicating a word selected by a user is received. The user may select the word from a page displayed to the user (e.g., by double-clicking the word).

In step 520, a definition request for the word is sent to a definition server, and in step 530, a response to the definition request is received from the definition server.

In step 540, a translation request for the word is sent to a translation server, and in step 550, a response to the translation request is received from the translation server.

In step 560, a determination is made whether to provide the user with a definition or a translation of the word based on the responses from the definition server and the translation server. For example, a determination may be made to provide the user with the definition when the response to the definition request includes at least one definition of the word. A determination may be made to provide the user with the translation when the response to the definition request indicates no definition and the response to the translation request includes at least one translation of the word.

In step 570, the user is provided with the definition or the translation of the word based on the determination. For example, the definition or the translation may be displayed within a bubble located next to the word selected by the user.

It should be appreciated that some of the steps in FIG. 5 may be performed in parallel. For example, the definition request and the translation request in steps 520 and 540 may be sent in parallel to the definition server and the translation server, respectively.

In one aspect, if the definition/translation system 130 does not receive a response to the definition request, then the definition/translation system 130 may still perform the process in FIG. 5 by pretending that a response indicating no definition was received. Similarly, if the definition/translation system 130 does no receive a response to the translation request, then the definition/translation system 130 may still perform the process in FIG. 5 by pretending that a response indicating no translation was received.

In one aspect, the definition database 110 may comprise two databases (not shown). In this aspect, one of the databases may be designated as a primary definition database and the other database may be designated as a secondary definition database. The primary definition database may include definitions of words from an authoritative source (e.g., dictionary from a respected publisher), which may be licensed from the publisher of the source. The secondary definition database may include definitions of words pulled from web pages (e.g., Wikipedia pages), articles, and/or other sources. The primary and secondary databases may be located on the same physical memory or different memories. In this aspect, definitions from the primary definition database may generally be considered more trustworthy than definitions from the secondary definition database.

In this aspect, when the definition server 115 receives a definition request for a word from the definition/translation system 130, the definition server 115 may search both the primary definition database and the secondary definition database for a definition of the word. If the definition server 115 finds one or more definitions of the word in the primary definition database, then the definition server 115 may include the one or more definitions in the response message including an indicator indicating that the one or more definitions are from the primary definition database. Similarly, if the definition server 115 finds one or more definitions of the word in the secondary definition database, then the definition server 115 may include the one or more definitions in the response message including an indicator indicating that the one or more definitions are from the secondary definition database.

Figure 6:
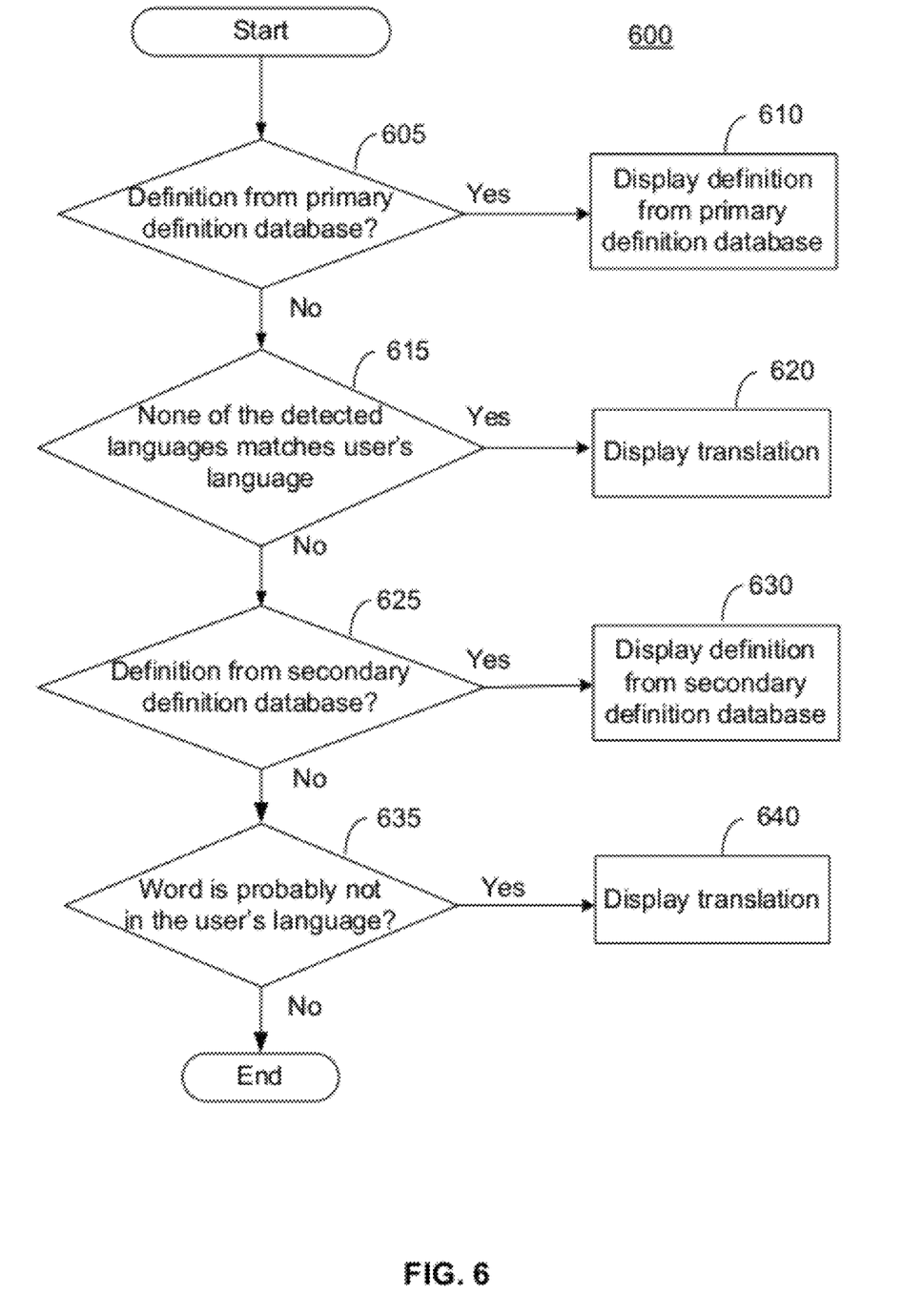
FIG. 6 is a flowchart of a process for providing a definition or a translation of a word according to another aspect of the subject technology.

FIG. 6 shows a process 600 for determining whether to provide a user with a definition or a translation according to an aspect of the subject technology. In this aspect, the definition/translation system 130 may send a definition request and a translation request for a selected word to the definition server 115 and the translation server 125, respectively, and receive response messages from the definition server 115 and the translation server 125. The process 600 may then determine whether to provide a definition or a translation of the selected word to the user based on the response messages.

In step 605, the process determines whether the response message from the definition server includes a definition of the word from the primary definition database (e.g., licensed definition of the word). If the response message includes a definition from the primary definition database, then the process displays the definition to the user in step 610. In this case, if the response message includes multiple definitions from the primary definition database, then the process may display the top definition or all of the definitions. If the response message does not include a definition from the primary definition database, then the process proceeds to step 615.

In step 615, the process determines whether none of the detected source languages in the response message from the translation server 125 matches the user's language. If none of the detected source languages matches the user's language and the response message from the translation server 125 includes a translation of the word, then the process displays the translation of the word to the user in step 620. In this case, if the response message includes multiple translations, then the process may display the translation corresponding to the highest probability or all of the translations. Otherwise, the process proceeds to step 625.

In step 625, the process determines whether the response message from the definition server includes a definition from the secondary definition database (e.g., web definition). If the response message includes a definition from the secondary definition database, then the process displays the definition to the user in step 630. Otherwise, the process proceeds to step 635.

In step 635, the process determines whether the word is probably not in the user's language. For example, the process may determine that the word is probably not in the user's language when one of the detected source languages matches the user's language, but has a lower probability than at least another one of the detected source languages. If the word is probably not in the user's language, then the process displays a translation of the word in the user's language in step 640. Otherwise, the process may give up and display no definition or translation to the user.

In one aspect, steps 625 and 630 may be omitted and the process may display both the primary and secondary definitions in step 610 when both the primary and second definitions are available. In this aspect, the primary definition may be displayed first.

In one aspect, the processor 210 may determine a language of a page or document that is being viewed by the user. To do this, the processor 210 may send a portion or all of the text of the page or document to the translation server 125. The translation server 125 may then detect the source language of the page or document based on the received text using any of the techniques discussed above and/or other techniques. The translation server 125 may then send a response message to the processor 210 indicating the detected source language for the page or document. If the translation server 125 detects two or more source languages, then the translation server 125 may send a response message indicating the detected source language with the highest probability. Alternatively, a web page may include metadata indicating the language of the page and the processor 210 may determine the language of the page based on the metadata.

In this aspect, the processor 210 may use the detected source language of the page to determine which translation of a selected word to display to the user. For example, in step 615, if one of the translations from the translation server 125 has a corresponding detected source language that matches the detected language of the page, then the processor 210 may display this translation in step 620.

Figure 7:
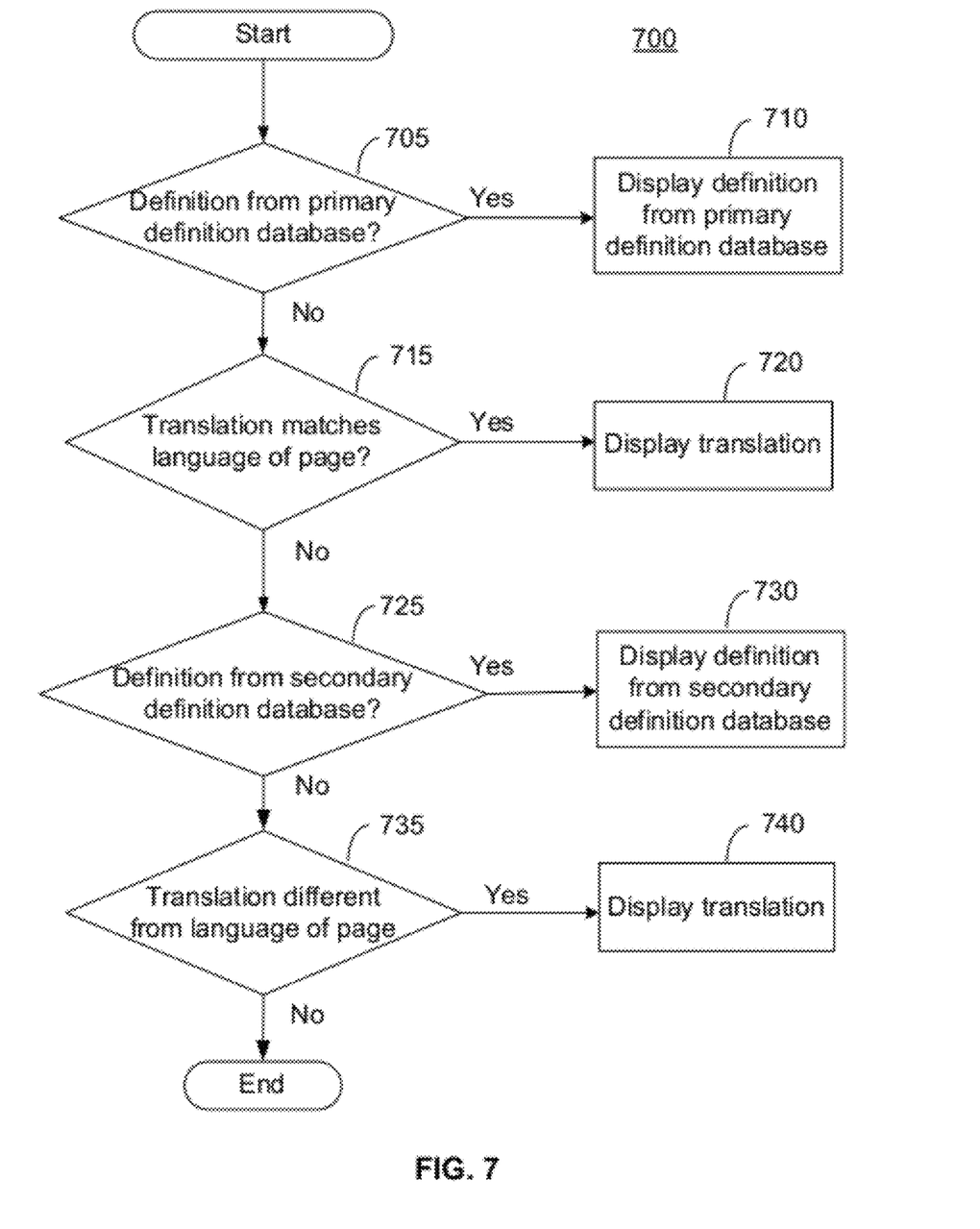
FIG. 7 is a flowchart of a process for providing a definition or a translation of a word according to another aspect of the subject technology.

FIG. 7 shows a process 700 for determining whether to provide a user with a definition or a translation according to another aspect of the subject technology. In this aspect, the definition/translation system 130 may send a definition request and a translation request for a selected word to the definition server 115 and the translation server 125, respectively, and receive response messages from the definition server 115 and the translation server 125. In addition, the definition/translation system 130 may detect the language of the page from which the word is selected. The process 700 may then determine whether to provide a definition or a translation of the selected word to the user based on the response messages and the detected language of the page.

In step 705, the process determines whether the response message from the definition server includes a definition of the word from the primary definition database (e.g., licensed definition of the word). If the response message includes a definition from the primary definition database, then the process displays the definition to the user in step 710. In this case, if the response message includes multiple definitions from the primary definition database, then the process may display the top definition or all of the definitions. In one aspect, the process may also require that the detected language of the page match the user's language in step 705 before displaying the definition in step 710. If the response message does not include a definition from the primary definition database, then the process proceeds to step 715.

In step 715, the process determines whether the response message from the translation server 120 includes a translation having a detected source language that matches the detected language of the page. If the response message includes a translation matching the detected language of the page, then the process displays the translation to the user in step 720. Otherwise, the process proceeds to step 725.

In step 725, the process determines whether the response message from the definition server includes a definition from the secondary definition database (e.g., web definition). If the response message include a definition from the secondary definition database, then the process displays the definition to the user in step 730. Otherwise, the process proceeds to step 735.

In step 735, the process determines whether the response message from the translation server 120 includes a translation having a detected source language that is different from the detected language of the page. If the response message includes a translation that is different from the detected language of the page, then the process displays the translation to the user in step 740. Otherwise, the process may give up and display no definition or translation to the user.

In one aspect, when the processor 210 displays a bubble showing a definition or a translation of a selected word, the processor 210 may give the user the option of selecting another word within the bubble. For example, if the user does not understand a word in the definition or the translation, then the user may select the word within the bubble (e.g., by double-clicking on the word). The processor 210 may then send a definition request and a translation request for the word in the user's language to the definition server 115 and the translation server 125, respectively. In response to the definition request, the definition server 115 may search for a definition of the word in the user's language in the definition database 110. If the definition server 115 finds a definition of the word, then the definition server 115 may send the definition the processor 210 in a response message. In response to the translation request, the translation server 125 may detect the source language of the word and search for a translation of the word in the translation database 120. If the translation server 125 finds a translation of the word, then the translation server 125 may send the translation and the detected source language to the processor 210 in a response message.

The processor 210 may then determine whether to display the definition or the translation of the word based on the received response messages using any one of the methods described above. The processor 210 may then display the definition or the translation of the word based on the determination. The processor may display the definition or the translation in the same bubble as the originally selected word or in a new bubble. The new bubble may be displayed next to the original bubble or on top of the original bubble.

Although the definition server 115 and the translation server 125 may be located on remote servers, it should be appreciated that the subject technology is not limited to this example. For example, one or both of the definition server 115 and the translation server 125 may be located on the same computer as the definition/translation system 130. In this example, the processes of the definition server 115, the translation server 125 and/or the definition/translation system 130 may be implemented using computer-readable instructions that are executed by the same processor. Also the, definition database 110 and/or the translation database 120 may be stored in local memory of the computer.

Many of the above-described features and applications may be implemented as a set of machine-readable instructions stored on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" and "program" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computers and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD- R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing a definition or a translation, comprising:
    receiving an input indicating a word selected by a user;
    determining a user's language;
    communicating the determined user's language to a definition server and a translation server;
    sending, simultaneously, a definition request for the word to the definition server along with sending a translation request for the word to the translation server;
    receiving a response to the definition request from the definition server, wherein the response to the definition request indicates whether there is at least one definition of the word in the user's language;
    receiving a response to the translation request from the translation server, wherein the response to the translation request indicates whether there is at least one translation of the word in the user's language, wherein the response to the definition request and the response to the translation request are received simultaneously;
    determining whether to provide the user with a definition or a translation of the word based on the responses from the definition server and the translation server, wherein the determination comprises:
    determining to provide the user with the definition of the word when the response to the definition request includes at least one definition of the word in the user's language; and
    determining to provide the user with the translation of the word when the response to the definition request indicates that there is no definition of the word in the user's language and the response to the translation request includes at least one translation of the word in the user's language; and
    providing the user with the definition or the translation of the word based on the determination of whether to provide the user with a definition or a translation of the word, wherein the providing comprises a bubble showing the at least one definition or the at least one translation of the selected word.

2. The method of claim 1, further comprising detecting a language of a page, the page comprising a plurality of words including the word, and wherein determining whether to provide the user with a definition or a translation of the word comprises determining to provide the user with the translation of the word when the response to the definition request indicates that there is no definition of the word in the user's language, the response to the translation request includes at least one translation of the word in the user's language, and the response to the translation request indicates a detected source language of the word matching the detected language of the page.

3. The method of claim 1, wherein determining whether to provide the user with a definition or a translation of the word comprises determining to provide the user with the definition of the word when the response to the definition request includes at least one definition of the word in the user's language, and the response to the translation request indicates a detected source language of the word matching the user's language.

4. A computer-implemented method for providing a definition or a translation, comprising:
    receiving an input indicating a word selected by a user;
    determining a user's language;
    communicating the determined user's language to a definition server and a translation server;
    sending, simultaneously, a definition request for the word to the definition server along with sending a translation request for the word to the translation server;
    receiving a response to the definition request from the definition server, wherein the response to the definition request indicates whether there is at least one definition of the word in the user's language;
    receiving a response to the translation request from the translation server, wherein the response to the translation request indicates whether there is at least one translation of the word in the user's language wherein the response to the definition request and the response to the translation request are received simultaneously;
    determining whether to provide the user with a definition or a translation of the word based on the responses from the definition server and the translation server, wherein the determination comprises:
    determining to provide the user with the definition of the word when the response to the definition request includes at least one definition of the word in the user's language from a primary definition database; and
    determining to provide the user with the translation of the word when the response to the definition request indicates that there is no definition of the word in the user's language from the primary definition database and the response to the translation request includes at least one translation of the word in the user's language; and
    providing the user with the definition or the translation of the word based on the determination of whether to provide the user with a definition or a translation of the word, wherein the providing comprises a bubble showing the at least one definition or the at least one translation of the selected word.

5. The method of claim 4, wherein determining whether to provide the user with a definition or a translation of the word comprises determining to provide the user with the definition of the word when the response to the definition request indicates that there is no definition of the word in the user's language from the primary definition database, the response to the translation request indicates that there is no translation of the word in the user's language, and the response to the definition request includes at least one definition of the word in the user's language from a secondary definition database.

6. The method of claim 4, wherein determining whether to provide the user with a definition or a translation of the word comprises determining to provide the user with the definition of the word when the response to the definition request indicates that there is no definition of the word in the user's language from the primary definition database, the response to the translation request indicates a detected source language of the word matching the user's language, and the response to the definition request includes at least one definition of the word in the user's language from a secondary definition database.

7. The method of claim 4, further comprising detecting a language of a page, the page comprising a plurality of words including the word, and wherein determining whether to provide the user with a definition or a translation of the word comprises determining to provide the user with the definition of the word when the response to the definition request indicates that there is no definition of the word in the user's language from the primary definition database, the response to the translation request indicates a detected source language of the word that is different from the detected language of the page, and the response to the definition request includes at least one definition of the word in the user's language from a secondary definition database.

8. The method of claim 1, wherein providing the user with the definition or the translation of the word comprises displaying the definition or the translation of the word to the user.

9. The method of claim 8, wherein the definition or the translation of the word is displayed within a bubble located next to the word on a display.

10. The method of claim 1, further comprising including a plurality of other words from a page in the translation request to be used to detect a source language of the word.

11. A system for providing a definition or a translation, the system comprising:
    one or more processors; and
    a machine-readable medium comprising instructions stored therein, which when executed by the one or more processors, cause the one or more processors to perform operations comprising:
    receiving an input indicating a word selected by a user;
    determining a user's language based on a user setting;
    sending, simultaneously, a definition request for the word to the definition server along with sending a translation request for the word to the translation server, wherein the translation request includes an indication of the user's language;
    receiving a response to the definition request from the definition server, wherein the response to the definition request indicates whether there is at least one definition of the word in the user's language;
    receiving a response to the translation request from the translation server, wherein the response to the translation request indicates whether there is at least one translation of the word in the user's language wherein the response to the definition request and the response to the translation request are received simultaneously;
    determining whether to provide the user with a definition or a translation of the word based on the responses from the definition server and the translation server, wherein the determination comprises:
    determining to provide the user with a definition of the word when the response to the definition request includes at least one definition of the word in the user's language; and
    determining to provide the user with the translation of the word when the response to the definition request indicates that there is no definition of the word in the user's language and the response to the translation request includes at least one translation of the word in the user's language; and
    providing the user with the definition or the translation of the word based on the determination of whether to provide the user with a definition or a translation of the word, wherein the providing comprises a bubble showing the at least one definition or the at least one translation of the selected word.

12. The system of claim 11, wherein determining whether to provide the user with a_definition or a translation of the word comprises determining to provide the user with the definition of the word when the response to the definition request includes at least one definition of the word in the user's language, and the response from the translation server indicates a detected source language of the word matching the user's language.

13. The system of claim 11, wherein determining whether to provide the user with a definition or a translation of the word comprises determining to provide the user with the translation of the word when the response to the definition request indicates that there is no definition of the word in the user's language, the response to the translation request includes at least one translation of the word in the user's language, and the response to the translation request indicates a detected source language of the word that is different from the user's language.

14. The system of claim 11, wherein providing the user with the definition or the translation of the word comprises displaying the definition or the translation of the word within a bubble on a display.

15. A non-transitory machine-readable medium comprising instructions stored therein, which when executed by a machine, cause the machine to perform operations comprising:
   receiving an input indicating a word selected by a user;
   determining a user's language;
   communicating the determined user's language to a definition server and a translation server;
   sending, simultaneously, a definition request for the word to the definition server along with sending a translation request for the word to the translation server, wherein the translation request includes an indication of the user's language;
   receiving a response to the definition request from the definition server, wherein the response to the definition request indicates whether there is at least one definition of the word in the user's language;
   receiving a response to the translation request from the translation server, wherein the response to the translation request indicates whether there is at least one translation of the word in the user's language, wherein the response to the definition request and the response to the translation request are received simultaneously;
   determining whether to provide the user with a definition or a translation of the word based on the responses from the definition server and the translation server, wherein the determination comprises:
   determining to provide the user with a definition of the word when the response to the definition request includes at least one definition of the word in the user's language; and
   determining to provide the user with the translation of the word when the response to the definition request indicates that there is no definition of the word in the user's language and the response to the translation request includes at least one translation of the word in the user's language; and
   displaying the definition or the translation of the word within a bubble on a display based on the determination of whether to provide the user with a definition or a translation of the word.

16. The machine-readable medium of claim 15, wherein the operations further comprise displaying an icon representing a pronunciation of the word when the response to the definition request includes at least one definition of the word and an audio file of the pronunciation of the word.

17. The machine-readable medium of claim 15, wherein the operations further comprise displaying an icon representing a pronunciation of the word when the response to the translation request includes at least one translation of the word and an audio file of the pronunciation of the word.

18. The machine-readable medium of claim 15, wherein the operations further comprise:
   receiving an input indicating another word within the bubble selected by the user; and
   displaying a definition or a translation of the other word on the display.

19. The method of claim 2, wherein detecting a language of a page comprises detecting the language of the page using a language classifier.

20. The method of claim 3, wherein the source language of the word is detected using a language classifier.

21. The method of claim 6, wherein the source language of the word is detected using a language classifier.

22. The method of claim 7, wherein detecting a language of a page comprises detecting the language of the page using a language classifier.

* * * * *